United States Patent
Marcon

(10) Patent No.: US 11,295,038 B2
(45) Date of Patent: Apr. 5, 2022

(54) METHOD FOR SECURING DATA INPUT, COMMUNICATIONS TERMINAL AND CORRESPONDING PROGRAM

(71) Applicant: Banks and Acquirers International Holding, Paris (FR)

(72) Inventor: Jerome Marcon, Paris (FR)

(73) Assignee: BANKS AND ACQUIRERS INTERNATIONAL HOLDING, Paris (FR)

(*) Notice: Subject to any disclaimer, the term of this patent is extended or adjusted under 35 U.S.C. 154(b) by 324 days.

(21) Appl. No.: 16/467,757

(22) PCT Filed: Nov. 27, 2017

(86) PCT No.: PCT/EP2017/080500
§ 371 (c)(1),
(2) Date: Jun. 7, 2019

(87) PCT Pub. No.: WO2018/104091
PCT Pub. Date: Jun. 14, 2018

(65) Prior Publication Data
US 2020/0065529 A1    Feb. 27, 2020

(30) Foreign Application Priority Data

Dec. 9, 2016  (FR) ...................... 1662269

(51) Int. Cl.
*H04L 29/06*    (2006.01)
*G06F 21/83*    (2013.01)
(Continued)

(52) U.S. Cl.
CPC .......... *G06F 21/83* (2013.01); *G06F 3/04886* (2013.01); *G06F 21/6245* (2013.01); *G06Q 20/4012* (2013.01); *G07F 7/1041* (2013.01)

(58) Field of Classification Search
CPC .. G06F 21/83; G06F 21/6245; G06F 3/04886; G06Q 20/4012; G06Q 20/40; G07F 7/1041; G07F 7/1091
See application file for complete search history.

(56) References Cited

U.S. PATENT DOCUMENTS 9,196,111 B1    11/2015 Newman et al.
2015/0100498 A1*    4/2015 Edwards ............... H04L 9/3226
                                          705/72

(Continued)

FOREIGN PATENT DOCUMENTS

DE    102010022368 A1    12/2011
EP       1600847 A1    11/2005
GB       2438886 A    12/2007

OTHER PUBLICATIONS

English translation of the Written Opinion dated Feb. 21, 2018 for corresponding International Application No. PCT/EP2017/080500, filed Nov. 27, 2017.

(Continued)

*Primary Examiner* — Michael Simitoski
*Assistant Examiner* — Hany S. Gadalla
(74) *Attorney, Agent, or Firm* — David D. Brush; Westman, Champlin & Koehler, P.A.

(57) ABSTRACT

A method for securing entry of sensitive data, the method being implemented by a communications terminal having a processor, an entry touchpad screen on which the entry of sensitive data is carried out. Such a method includes: displaying a random keypad for the entry of a confidential code; receiving, by the processor, a reference pad display signal; and displaying the reference keypad, the reference keypad being inactive.

10 Claims, 2 Drawing Sheets

Figure 2:
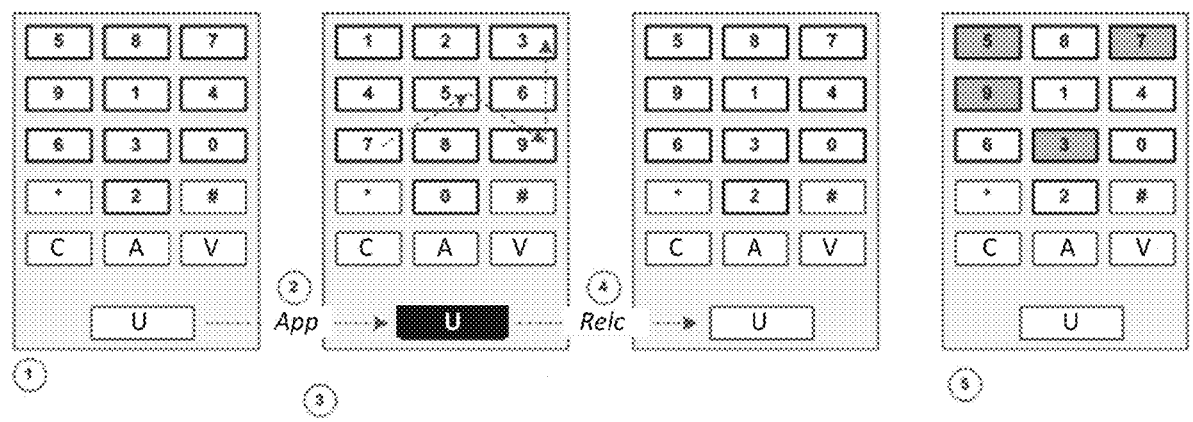

(51) Int. Cl.
*G06F 3/04886* (2022.01)
*G06F 21/62* (2013.01)
*G06Q 20/40* (2012.01)
*G07F 7/10* (2006.01)

(56) References Cited

U.S. PATENT DOCUMENTS

2016/0125193 A1* 5/2016 Dai Zovi ............... G06F 21/36
    726/28
2016/0224771 A1* 8/2016 Pike .................... G07F 7/1075
2017/0286723 A1* 10/2017 Zhou ...................... G06F 21/83

OTHER PUBLICATIONS

International Search Report and Written Opinion dated Feb. 21, 2018 for corresponding International Application No. PCT/EP2017/080500, filed Nov. 27, 2017.

* cited by examiner

METHOD FOR SECURING DATA INPUT, COMMUNICATIONS TERMINAL AND CORRESPONDING PROGRAM

CROSS-REFERENCE TO RELATED APPLICATIONS

This Application is a Section 371 National Stage Application of International Application No. PCT/EP2017/080500, filed Nov. 27, 2017, which is incorporated by reference in its entirety and published as WO 2018/104091 A1 on Jun. 14, 2018, not in English.

1. FIELD OF THE INVENTION

The invention relates to the processing of transaction data. The invention relates more particularly to the processing of transaction data that is used in a payment operation. The invention relates even more particularly to the processing of transaction data in the context of a payment transaction carried out jointly by a communications terminal and/or by a payment terminal connected to the communications terminal.

2. PRIOR ART

Payment in situations of mobility is a major factor in economic development. This is why many industrialists are proposing mobility payment solutions that are supposed to make life easier for the user. For example, there are many existing solutions that enable a user to make payments with his smartphone. These solutions are mainly of two types: the first type enables the smartphone to make online payment through a dedicated (or non-dedicated) application in order to purchase an item or service that is itself accessible through an online application. These solutions in their spirit are close to bankcard payment solutions that are accessible online through a personal computer and an Internet browser. Many solutions for processing payment transactions have been proposed in this case.

The second type relates to payment in a physical store with one's smartphone: using a dedicated application, this smartphone simulates the operation of a bankcard, often a contactless bankcard. Again, there is no lack of solutions to carry out this type of simulation and payment.

However, there is a somewhat different set of problems and issues in which the merchant himself is in a situation of mobility or at least a situation in which the merchant does not have any payment terminal. Such a situation can be encountered for example by merchants or professionals who are constantly on the move for their professional activity, for example country doctors, independent professionals and private cab drivers. These professionals, referred to herein by extension as merchants, need to receive payment from their customers but do not necessarily have the wish or ability to be equipped with independent payment terminals for receiving payment (for example because of the price of such terminals). This is why alternative solutions have been developed such as card readers to be connected to the smartphone.

All these approaches therefore enable the merchant and the user to receive or carry out payment by means of their mobile terminal (the smartphone) which then acts as a payment terminal and/or a cash register. The problem relates to the relative absence of securing of payment data and especially confidential data provided by the user such as the PIN code (the personal identification number). Indeed, the communications terminal in itself is not necessarily secure (unlike a "classic" payment terminal). It is therefore possible (and probable) that a communications terminal becomes the object of an unauthorized modification, for example by a fraudulent individual, seeking to retrieve bank card data that are used by the communications terminal to make the payment transactions. To carry out such an unauthorized modification of the communications terminal, the fraudulent individual can for example propose an application in an application store, this application having basic, non-fraudulent functions and a fraudulent function, the purpose of which is to retrieve bank card data.

Now it is very difficult or even impossible to ensure that the merchant's communications terminal is secured and this is the case for several reasons. The first reason relates to the great diversity of communications terminals in the market: such is the number of models of terminals that it is impossible in practice to have full control over the hardware and software architectures of all these terminals. This is especially the case with low-cost terminals known as "Chinese" terminals whose design is often a non-optimized copy of the design of existing terminals made by other manufacturers (such as Korean or American manufacturers) and especially do not integrate trusted execution environments, secure memories and the high-precision management of secure elements (for reasons of cost and absence of technological skills). The second reason relates to the fact that the communications terminal is above all a multimedia general-purpose terminal: it is not aimed at secure data processing. There is therefore no restriction whatsoever on the installation of applications or contents on this terminal.

Thus, the risk of bankcard data theft is even more of a problem when accompanied by the theft of the PIN code of these cards. Indeed, as explained earlier, existing devices are connected to the smartphone manage payment by using either magnetic stripe cards or integrated-circuit cards. In general, the use of a magnetic stripe makes it necessary to set down a handwritten signature to confirm the payment. In this case, the user uses a stylus and/or a finger to sign on the screen of the merchant's communications terminal. The use of an integrated-circuit card or a contactless card for its part requires the use of a PIN (personal identification number) code to confirm the transaction. To enter this PIN, the user uses a virtual keypad displayed on the screen of the communications terminal to enter his PIN. Now, by stealing this PIN code together with the bankcard data, a fraudulent person can make an integral copy of the user's (customer's) payment card without the knowledge of the customer and/or of the merchant. Now, the display of the virtual keypad for entering the PIN code is managed by the payment application which is installed on the communications terminal. There are several existing possibilities of fraud. It is not the object of the present application to describe them in detail.

Be that as it may, it is dangerous to enter a PIN code on a payment application executed on a smartphone. There are therefore solutions guarding against theft through the interception of entered data. This is done by presenting the user with a random keypad: the figures of the keypad are mixed randomly on the screen and the user must enter his PIN code (or any other confidential information) on this random keypad. Although these solutions have been extensively presented and explained, there is a major, persisting problem related to the fact that the user who has to use such a random keypad is often caught unprepared and does not necessarily succeed in using this keypad. This is one of the reasons for which this type of random keypad is ultimately of little use. It bewilders users who are therefore more or less irritated and disinclined to make further use of this type of keypad or of the application that uses this keypad.

There is therefore a need to propose a solution that resolves the above-mentioned problem at least in part.

3. SUMMARY

The present invention at least partly resolves this problem related to the use of random keypads. More particularly, the invention proposes a method for the display, during entry on the random keypad, of a reference keypad in the form of an image, this reference keypad being inactive.

This reference keypad displayed to the user, as a cue or memory trigger, enables the user to recall his code or his password more easily, so as to be then able to enter this code or this password on the random keypad. More particularly, a method is described for securing the entry of sensitive data, the method being implemented by a communications terminal comprising a processor, an entry touchpad screen on which the entry of sensitive data is carried out. Such a method comprises:
- a step of display of a random keypad for the entry of a confidential code;
- a step of reception, by the processor, of a reference pad display signal;
- a step of display of the reference keypad, said reference keypad being inactive.

According to one particular characteristic, the step of display of the reference keypad is preceded by a step for masking the random keypad.

According to one particular characteristic, the step of reception, by the processor, of the reference pad display signal is preceded by a step for pressing on a key situated at a pre-determined location of the communications terminal, leading to the transmission of the reference keypad display signal to the processor.

According to one particular characteristic, the step of display of the reference keypad ends at the interruption of the display signal.

According to one particular characteristic, the interruption of the display signal takes place at the interruption of the pressing on said key.

According to one particular characteristic, said reference keypad is displayed on said touchpad screen of said communications terminal in the form of an image representing a reference keypad.

According to one particular characteristic, the size of the image representing the reference keypad is smaller than the size of the random keypad.

According to one particular characteristic, said random keypad has a shape different from that of said reference keypad.

According to another aspect, the technique also relates to a communications terminal comprising means for securing the entry of sensitive data and comprising a processor, an entry touchpad screen on which the entry of sensitive data is carried out. Such a terminal comprises:
- means for displaying a random keypad for the entry of the confidential code;
- means of reception, by the processor, of a reference pad display signal;
- means of display of the reference keypad, said reference keypad being inactive.

According to a preferred implementation, the different steps of the methods according to the invention are performed by one or more software programs or computer programs comprising software instructions that are to be executed by a data processor according to the invention and are designed to control the execution of the different steps of the methods.

The invention is therefore aimed at providing a program capable of being executed by a computer or by a data processor, this program comprising instructions to command the execution of the steps of a method as mentioned here above.

This program can use any programming language whatsoever and can be in the form of source code, object code or intermediate code between source code and object code such as in a partially compiled form or in any other desirable form whatsoever.

The invention is also aimed at providing an information carrier or medium readable by a data processor, and comprising instructions of a program as mentioned here above.

The information medium can be any entity or device whatsoever capable of storing the program. For example, the medium can comprise a storage means such as a ROM, for example, a CD ROM or microelectronic circuit ROM or again a magnetic recording means, for example a floppy disk or a hard disk drive.

Besides, the information medium can be a transmissible medium such as an electrical or optical signal, that can be conveyed by an element or optical cable, by radio or by other means. The program according to the invention can especially be downloaded from an Internet type network.

As an alternative, the information carrier can be an integrated circuit into which the program is incorporated, the circuit being adapted to executing or to being used in the execution of the method in question.

According to one embodiment, the proposed technique is implemented by means of software and/or hardware components. In this respect, the term "module" can correspond in this document equally well to a software component and to a hardware component or to a set of hardware and software components.

A software component corresponds to one or more computer programs, one or more sub-programs of a program or more generally to any element of a program or a piece of software capable of implementing a function or a set of functions according to what is described here below for the module concerned. Such a software component is executed by a data processor of a physical entity (terminal, server, gateway, router etc) and is capable of accessing the hardware resources of this physical entity (memories, recording media, communications buses, input/output electronic boards, user interfaces etc).

In the same way, a hardware component corresponds to any element of a hardware assembly capable of implementing a function or a set of functions according to what is described here below for the module concerned. It can be a programmable hardware component or a component with an integrated processor for the execution of software, for example, an integrated circuit, smart card, a memory card, an electronic board for the execution of firmware etc.

Each component of the system described here above can of course implement its own software modules.

The different embodiments mentioned here above can be combined with one another to implement the proposed technique.

4. DRAWINGS

Figure 1:
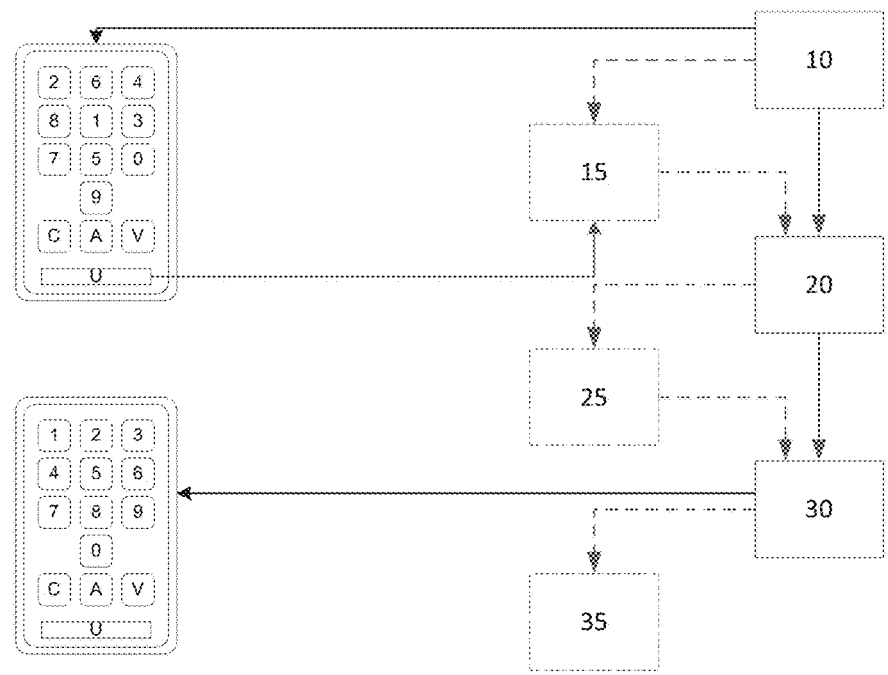
Figure 3:
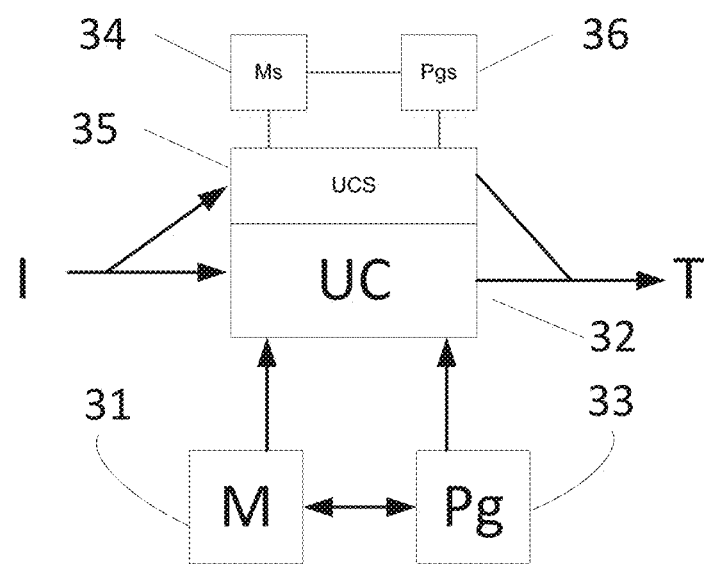

Other features and advantages of the invention shall appear more clearly from the following description of a preferred embodiment, given by way of a simple illustrative and non-exhaustive example and from the appended drawings, of which:

FIG. 1 is a block diagram of the proposed technique for the entry of sensitive data;

FIG. 2 presents the entry in the context of a transaction;

FIG. 3 describes a communications terminal for implementing the processing method described.

5. DESCRIPTION

1.1. Reminders

As explained here above, the present technique brings a solution to the problem of the use of random virtual keypads used in prior-art techniques. More particularly, the invention proposes a method of display of a non-random keypad in a way that is complementary to the display of the random keypad.

This method enables the user, bewildered by the display of the random keypad, to have available a standard keypad to which he can refer. It can be noted that the standard keypad is inactive. This is a keypad displayed by way of information, enabling the user to recall his code, for example his PIN code. The goal is to overcome the problems and issues posed by the memorizing method applied by the user. It may be recalled that a reference keypad is a keypad complying with the standards of display of keys in a country considered. A random keypad is a keypad comprising a number of keys appreciably identical to the number of keys of a standard keypad (a reference keypad) but in which the keys have been distributed pseudo-randomly or randomly according to a method of drawing one or more numbers and distributing keys as a function of this number or these numbers; such a process is not the object of the present invention. If need be, some keys of the random keypad can be disposed in the same way as in the reference keypad. It can be for example a pinpad, correction, cancellation and confirmation keys which are generally situated on the lower row of keys on the keypad.

The invention is intrinsically linked to a problem, brought to light by the inventors, that originates in the cognitive and memory processes implemented by users in order to recall the various passwords and confidential codes that have become commonplace in daily life. Thus, for example, the memorizing of PIN codes such as bank card codes often relies on the memorizing of a gesture done more or less automatically (depending on the individual). In this sense, the invention can be called a problem invention. More particularly, the problem that has been brought to light by the inventors and comes into play in the rejection by users of virtual keypads is that a large majority of users memorize above all the gesture made by the hand when entering a PIN code or a password. This gesture, which is a sort of reflex, is implemented although the user does not recall the characters (digits, letters) that form this PIN code or this password. Thus, when a random keypad is presented to the user, his first reflex is to start tapping according to the reflex tapping scheme corresponding to a traditional keypad. Such a reflex invariably causes the entry of a wrong code, which has a consequence of upsetting the user or at least irritating him.

Now, as explained here above, the use of a random keypad is necessary in order to meet security needs. The technique devised by the inventors consists in bringing the user information enabling him to more rapidly assimilate the fact that the PIN code or the password must be entered with care (i.e. by recalling the numbers and/or characters that form it and not only through an entry reflex). This providing of information is generally done by presenting the user with a non-random keypad (a standard keypad called a reference keypad). The display of this standard keypad enables the user to recall the code or the password to be entered by mentally (or physically) performing the gesture that he would have made with this standard keypad: the user is thus more capable of remembering the digits or the letters and their order.

Referring to FIG. 1, we present the general principle of the proposed method, a method implemented by a processor of a communications terminal during a securing operation comprising the entry of a confidential code, a method that comprises:

a step of display (10) of a random keypad for the entry of the confidential code;

a step of reception (20), by the processor, of a reference pad display signal;

a step of display (30) of the reference keypad, said reference keypad being inactive.

According to one complementary characteristic, in one embodiment, the step of display of the reference keypad is preceded by a step (25) for masking the random keypad.

According to one complementary characteristic, in one embodiment, the step of reception (20) by the processor of the reference pad display signal is preceded by a step for pressing (15) on a key situated at a pre-determined location of the communications terminal, that leads to the transmission of the reference pad display signal to the processor.

According to one complementary characteristic, in one embodiment, the step of display (30) of the reference keypad comes to an end (35) during the interruption of the display signal.

Thus, as explained here above, depending on the embodiments, the non-random keypad will be displayed as a replacement of the random keypad (it takes the position of the random keypad on the display) or in addition to the random keypad (it gets added to the random keypad on the display). This 'memory cue' keypad is inactive. It has the advantage, through this inactivity, of ensuring that even if the user enters his code or password on this keypad, his entries cannot be "intercepted" to provide information to any attacker.

In one basic embodiment, the standard keypad is displayed in the form of an image presented to the user at the user's request. More particularly, to display this image of a standard keypad, the user presses a pre-determined key (or presses a pre-determined location of the screen) enabling the display of the standard keypad that has just concealed the random keypad. In this basic embodiment, the duration of display is adjustable: for example, the display can be defined for a given time (five seconds, ten seconds) or else it can depend on an action by the user (so long as the user wishes to see the reference keypad, this keypad is displayed).

Another characteristic relates to the size of the reference keypad. The display of the reference keypad, according to a first variant, is the same as that of the random keypad: the size of the keypad is identical and the keys are identical. Only the locations of the keys change.

According to a second variant, the display of the reference keypad is different from the display of the random keypad: the reference keypad is displayed with a smaller size (than that of the random keypad). This can be due to two factors: the first factor relates to the fact that, in addition to the reference keypad, an information message is presented to the user. This message gives the user the information according to which the reference keypad is inactive and enables only the recalling of the confidential code. Thus, this variant can be implemented on a touchpad screen of smaller size. The second factor relates to the fact that the reference keypad and the random keypad can be displayed jointly. At the same time, it is desired to make the user understand that the reference keypad is inactive. Thus, the reference keypad is displayed in a size smaller than that of the random keypad, at the top left-hand side, or in the center or at the right-hand side of the random keypad. In this case, the user can request the display of this reference keypad but it is not an obligation. When the size of the screen allows it, the reference keypad can be displayed directly without the user's request.

Another characteristic relates to the concealment of the random keypad by the reference keypad. Indeed, it is desired to activate the user's memorization process and therefore enable a simpler entry of the confidential code or of the password. To this end, the process of creating a mental code-tapping scheme or password-striking scheme will be facilitated by causing the concealment of the random keypad by the reference keypad to vary in time. This characteristic can be applied of course to the case where the image of the reference keypad conceals the random keypad. According to this characteristic, the percentage of concealment varies according to time. For example, over a period of 10 seconds of display of the image of the reference keypad, a transfer function (for example of the sigmoid type or again an affine function) is used to obtain variation in the percentage of concealment from a value of 100% to for example 0%. The user can then gradually memorize the mental scheme that he must accomplish on the random keypad on the basis of the mental scheme, which he knows, of the reference keypad.

Yet another characteristic relates to the random keypad itself: in order to further secure the process of entry of the code, and to do so when the display of the reference keypad conceals the random keypad, the process comprises, at the time of the reappearance of the random keypad, a step of computation (or determination) of a new random keypad that is different from the random keypad that was displayed before the concealment.

Another characteristic relates to the random keypad itself: according to the present invention, this random keypad has a shape different from that of the reference keypad. Thus, in one embodiment, while the reference keypad has a generally rectangular shape (especially for a pinpad), the random keypad for its part has rather a circular shape similar to that of a clock face, in which the numerical keys are distributed randomly. This has the advantage for the user of not mistaking the reference keypad and the random keypad for each other.

5.2. Description of One Embodiment

The embodiment presently described is related to the case in which the user enters a personal authentication code (a PIN code) on a communications terminal comprising a touchpad screen to confirm a payment transaction, this transaction being at least partly implemented by the communications terminal. The technique is more particularly implemented at the time of the entry of the PIN code, during a financial transaction involving the entry, for a user, of such a PIN code to confirm this transaction, and is described with reference to FIG. 2. This entry takes place as follows:

a step of display (1) of a random keypad, of the type comprising fifteen keys (ten numerical keys, one correction key, one cancellation key, one confirmation key, * and #); in this embodiment, the keypad also comprises a key for activating (U) the display on the reference keypad;

to recall his code, the user presses (2) (App), the activation key (U) for displaying the reference keypad which prompts the appearance of the image of the reference keypad in concealing the random keypad;

the user then mentally recalls his code (3); the image of the reference keypad remains displayed throughout the pressing of the activation key (U);

when the user releases (4) (Relc) the activation key, the random keypad reappears;

the user can then enter (5) the PIN code which he has recalled with the appearance of the reference keypad.

The activation key can be a key displayed on the touchpad screen of the communications terminal or else a physical key of the communications terminal (for example the key "home").

Thus, in this embodiment, the reference keypad remains displayed only for the time of the pressing action by the user. This (temporary) display has the effect of forcing the user to keep pressing the activation button in order to continue to be able to visualize the image of the reference keypad. The purpose of this constraint is to prevent the reference keypad from leading the user into error by making him believe that it is possible to enter his PIN code on the reference keypad. The fact that he keeps a finger pressed on the activation button almost mechanically prevents him from making a code entry.

When the reference keypad is displayed, the user can recall his code with the help of a mental gesture of entering the code on the standard keypad: it is assumed then that the user recalls the digits that form his code when viewing of the reference keypad and that it is thus this code that he has in memory when he releases the activation button and when the random keypad is again presented.

In this embodiment, there is no limit on the number of times that the operation of displaying the reference keypad can be done. However, depending on the conditions of operational implementation, the number of iterations of the process can be limited, especially by the need to implement a transaction in an allotted time.

Thus, in this embodiment, the user is given, at his request, an image of a standard digital keypad which is a reference keypad that masks the random keypad.

5.3. Other Features and Advantages

With reference to FIG. 3, we describe a communications terminal implemented to manage the entry of sensitive data according to the method described here above.

For example, the communications terminal comprises a memory 31 comprising for example a buffer memory, a general processor 32, equipped for example with a microprocessor and controlled by a computer program 33 and/or a secure memory 34, a secure processor 35, controlled by a computer program 36, these processing units implementing methods of processing and entering of data as described here above to carry out a display of a reference (standard) keypad, for example in the form of an image, in order to enable the user to recall his code.

At initialization, the code instructions of the computer program 36 are for example loaded into a memory and then executed by the secure processor 35. The processor 35 inputs at least one piece of data representing a need to enter a piece of sensitive data. The secure processor 35 implements the steps of the method of processing according to the instructions of the computer program 36 to display a random keypad and enable the display of an image representing a standard (reference) keypad to which the user can relate in order to recall his code.

To this end, the communications terminal comprises, in addition to the memory 34, communications means such as network communications modules, data transmission means and data transmission circuits for transmitting data between the various components of the communications terminal.

The means described here above can take the form of a particular processor implemented within a terminal such as a payment terminal. According to one particular embodiment, the communications terminal implements a particular application which is in charge of carrying out the operations described here above, this application being for example provided by the manufacturer of the processor in question in order to enable the use of said processor. To this end, the processor comprises unique identification means. These unique identification means ensure the authenticity of the processor.

The invention claimed is:

1. A method for securing entry of sensitive data, the method being implemented by a communications terminal comprising a processor and an entry touchpad screen on which the entry of sensitive data is carried out, wherein the method comprises:
 displaying on the entry touchpad screen an active random keypad for entry of a confidential code, wherein the active random keypad allows entering the sensitive data;
 receiving a key press of a key of the communications terminal from a user wishing to enter the sensitive data and responsively generating a display signal for displaying a reference keypad;
 while the active random keypad is being displayed, receiving, by the processor, the display signal for displaying the reference keypad; and
 displaying, by the processor, the reference keypad on the entry touchpad screen, said reference keypad being inactive and preventing entry of the sensitive data via the reference keypad and said reference keypad overlapping at least part of said active random keypad.

2. The method according to claim 1, wherein the displaying of the reference keypad is preceded by masking the active random keypad.

3. The method according to claim 1, wherein the the key is situated at a pre-determined location of the communications terminal, leading to transmission of the display signal for the reference keypad to the processor.

4. The method according to claim 3, wherein the displaying of the reference keypad ends at an interruption of the display signal and wherein the interruption of the display signal takes place at an interruption of the pressing on said key.

5. The method according to claim 1, wherein the displaying of the reference keypad ends at an interruption of the display signal.

6. The method according to claim 1, wherein said reference keypad is displayed on said touchpad screen of said communications terminal in the form of an image representing a reference keypad.

7. The method according to claim 6, wherein a size of the image representing the reference keypad is smaller than a size of the active random keypad.

8. The method according to claim 1, wherein said active random keypad has a shape different from that of said reference keypad.

9. A communications terminal for securing entry of sensitive data and comprising:
 a processor;
 an entry touchpad screen on which the entry of sensitive data is carried out; and
 a non-transitory computer-readable medium comprising instructions stored thereon, which when executed by the processor configure the communications terminal to perform acts comprising:
  displaying on the entry touchpad screen an active random keypad for entry of a confidential code, wherein the active random keypad allows entering the sensitive data;
  receiving a key press of a key of the communications terminal from a user wishing to enter the sensitive data and responsively generating a display signal for displaying a reference keypad;
  while the active random keypad is being displayed, receiving, by the processor, the display signal for displaying the reference keypad; and
  displaying, by the processor, the reference keypad on the entry touchpad screen, said reference keypad being inactive and preventing entry of the sensitive data via the reference keypad and said reference keypad overlapping at least part of said active random keypad.

10. A non-transitory computer-readable medium comprising a computer program product stored thereon, which comprises program code instructions for executing a method of securing entry of sensitive data on a communications terminal, when the instructions are executed by a processor of the communications terminal, wherein the instructions configure the communications terminal to:
 displaying on an entry touchpad screen of the communications terminal an active random keypad for entry of a confidential code, wherein the active random keypad allows entering the sensitive data;
 receiving a key press of a key of the communications terminal from a user wishing to enter the sensitive data and responsively generating a display signal for displaying a reference keypad;
 while the active random keypad is being displayed, receiving, by the processor, the display signal for displaying the reference keypad; and
 displaying, by the processor, the reference keypad on the entry touchpad screen, said reference keypad being inactive and preventing entry of the sensitive data via the reference keypad and said reference keypad overlapping at least part of said active random keypad.

* * * * *